(12) United States Patent
Fishman et al.

(10) Patent No.: US 7,941,048 B2
(45) Date of Patent: May 10, 2011

(54) LOSS OF SIGNAL DETECTION

(75) Inventors: Daniel Fishman, Lakewood, NJ (US);
Alan Gnauck, Middletown, NJ (US);
Yuan-Hua Kao, Holmdel, NJ (US);
Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 832 days.

(21) Appl. No.: 11/772,107

(22) Filed: Jun. 29, 2007

(65) Prior Publication Data
US 2009/0003830 A1    Jan. 1, 2009

(51) Int. Cl.
*H04B 10/08* (2006.01)
*H04B 17/00* (2006.01)

(52) U.S. Cl. .......... 398/17; 398/9; 398/18; 398/20; 398/33; 398/34; 398/97; 398/177; 398/180

(58) Field of Classification Search .......... 398/1–38, 398/97, 177, 180; 372/29.01–29.32; 359/323
See application file for complete search history.

(56) References Cited

U.S. PATENT DOCUMENTS

| 5,299,212 | A  | * | 3/1994  | Koch et al. ..................... 372/32 |
| 6,233,262 | B1 | * | 5/2001  | Mesh et al. ..................... 372/32 |
| 6,266,168 | B1 | * | 7/2001  | Denkin et al. ..................... 398/5 |
| 6,782,017 | B1 | * | 8/2004  | Kai et al. ..................... 372/29.02 |
| 2002/0003643 | A1 | * | 1/2002  | Qian et al. ..................... 359/127 |
| 2003/0067667 | A1 | * | 4/2003  | Wang et al. ..................... 359/323 |
| 2005/0232627 | A1 | * | 10/2005 | Sun et al. ..................... 398/26 |

OTHER PUBLICATIONS

Liu et al: "Athermal Optical Demodulator for OC-768 DPSK and RZ-DPSK Signals" IEEE Phtonics Technology Letters, vol. 17, No. 12, Dec. 2005, pp. 2610-2612.*

* cited by examiner

*Primary Examiner* — Li Liu
(74) *Attorney, Agent, or Firm* — Brosemer, Kolefas & Associates (57) ABSTRACT

An apparatus and a method for accurately detecting Loss of Optical Power (LOS) by noise power cancellation effect and optical power is measured at two output ports of an athermal periodic filter, wherein one output port in the optical frequency domain, is aligned with the signal channels of an input WDM signal (on-grid port), whereas the second output port is aligned complementary to the first output port (off-grid port). In a preferred embodiment, the apparatus computes the ratio of the measured optical powers at the two output ports of the periodic filter, and comparing them to a threshold value that is determined from the overall common-mode rejection ratio (CMRR) of the detection apparatus. In an alternative embodiment, the apparatus additionally compares the optical power measured at the on-grid port to a threshold power that is determined from system design parameters.

21 Claims, 5 Drawing Sheets

LOSS OF SIGNAL DETECTION

FIELD OF THE INVENTION

This invention relates generally to optical transport networks, including Wavelength Division Multiplexed (WDM) transport networks, and more particularly to an apparatus and method for detecting Loss of Optical Signal (LOS) in optical networks.

BACKGROUND OF THE INVENTION

In optical transport networks, it is desirable to provide information regarding presence or absence of optical signal at each repeater site through a LOS detection unit for network management purpose. A LOS can also occur due to a fiber cut in the fiber span prior to the repeater. One prior art approach to LOS detection (see for example, U.S. Pat. No. 6,075,629 issued to Al-Salameh et al., June 2000) is based on direct measurement of total signal power and total noise power within an amplification band, and comparing the measured signal power and noise power with an expected threshold noise power within the amplification band. This approach becomes inaccurate when the signal power becomes substantially smaller than the noise power, for example in a transmission link where transmission loss in a fiber span is high or signal launch power is low, such that optical signal to noise ratio (OSNR) is low.

Another prior art approach (see for example, U.S. Pat. No. 6,266,168 issued to Denkin et al., July 2001) uses an interference filter for improving the sensitivity of LOS detection in an optical protection switch in a bidirectional optical communication node. More specifically, the interference filter filters signals received over the service and protection paths to generate a main signal and a complementary signal for each of the paths.

SUMMARY OF THE INVENTION

According to the principles of the invention, a LOS detection unit includes a periodic optical filter having two output ports, wherein periodic passband transmission characteristics of the output ports in the frequency domain, are complementary. The periodicity of passbands of the periodic optical filter in the frequency domain is also referred to as the free spectral range (FSR) of the filter. Additionally, the transmission characteristics of the output ports of the periodic optical filter is selected such that center frequencies of the periodic passbands of at least one output port (on-grid port) coincide with the signal channel grid of a WDM input signal, and center frequencies of the periodic passbands of its complementary output port (off-grid port) is offset from the signal channel grid of the WDM input signal by a specified amount. More specifically, the FSR of the periodic optical filter needs to be essentially equal to the channel spacing of the WDM signal, which is referred here as the minimum frequency spacing allocated for two adjacent channels in the WDM signal.

According to one aspect of the invention, the center frequencies of the passbands of one of the output ports of the periodic optical filter are aligned with an International Telecommunication Union (ITU) specified signal channel grid, such that the periodic passbands of this output port aligns to the channel centers of any input WDM signal that follows the ITU standard. Accordingly, the periodic filter separates the input WDM signal into two parts, an on-grid signal, and an off-grid signal. Advantageously, the passbands of either one, or both the output ports of the periodic filter can be symmetric (even) or asymmetric (uneven).

According to yet another aspect of the invention, two photodiodes having a time response substantially longer than a bit period, generate photocurrents in proportion to optical powers of the on-grid and off-grid signals for measuring respective optical signal powers of said on-grid and off-grid signals. In one preferred embodiment, LOS is detected by computing the ratio of the measured optical powers of the on-grid, and off-grid signals, and comparing said ratio with predetermined threshold numbers. In this preferred mode of operation, contributions from noise power at the two output ports can be made the same, and be effectively canceled, thereby improving the sensitivity by at least 10 times as compared to the conventional direct power measurement method.

According to yet another aspect of the invention, LOS is detected by comparing the measured optical power of the on-grid signal with threshold power levels that are predetermined from the system design parameters including maximum expected noise power at the on-grid port, minimum expected signal power at the on-grid port, or a combination thereof.

In one exemplary embodiment of the invention, the periodic optical filter comprises an athermal Michelson Delay Interferometer using free-space optics, said interferometer having an input port and two output ports, wherein the interferometer is designed such that the passband center frequencies of the periodic passbands of one of its two output ports coincide with the channel centers of the input WDM optical signal that are located on a ITU specified grid. More specifically, an athermal Michelson delay interferometer one input port that takes in an optical signal, one optical beam splitter to separate the signal into two beams with equal power, two interference paths for these two beams that are different in length, and two output ports, one outputting the constructive interference of the two beams and the other outputting the destructive interference of the two beams. The two interference paths are formed by the beam splitter and two high-reflection mirrors. Naturally, the transmission characteristics at the two output ports of the Michelson delay interferometer exhibits complementary periodic passbands. The optical delay associated with the length difference between these two interference paths is the inverse of the FSR of the interferometer. For a FSR of 50 GHz, the delay is 20 ps. The free-space optics based Michelson delay interferometer can be readily made to be athermal, i.e., its passband frequency locations are very insensitive to ambient temperature. According to one aspect of the invention, athermal interferometers have a temperature induced passband frequency drift of less than 10% of the FSR over a temperature range from −5° C. to 70° C., which is a typical temperature range specified for optical communications equipment.

In another exemplary embodiment of the invention, the periodic filter is an athermal step-phase Michelson delay interferometer having basically the same overall structure as the athermal Michelson delay interferometer described earlier. The only difference is that at least one of the high-reflection mirrors is replaced with a Gires-Tournois interferometer. The passbands of the step-phase Michelson delay interferometer are of a flat-top shape, which may allow more signal power to pass through the on-grid output port.

BRIEF DESCRIPTION OF THE DRAWING

Other aspects, features, and advantages of the present invention will become more fully apparent from the following detailed description, the appended claims, and the accompanying drawing in which:

DETAILED DESCRIPTION OF THE INVENTION

It should be understood that the particular embodiments described in the specification are only exemplary and are not intended to be limiting in structure and functionality, and include arrangements and modifications that are structurally and functionally similar within the spirit and scope of the principles of the present invention as defined by the appended claims.

Figure 1:
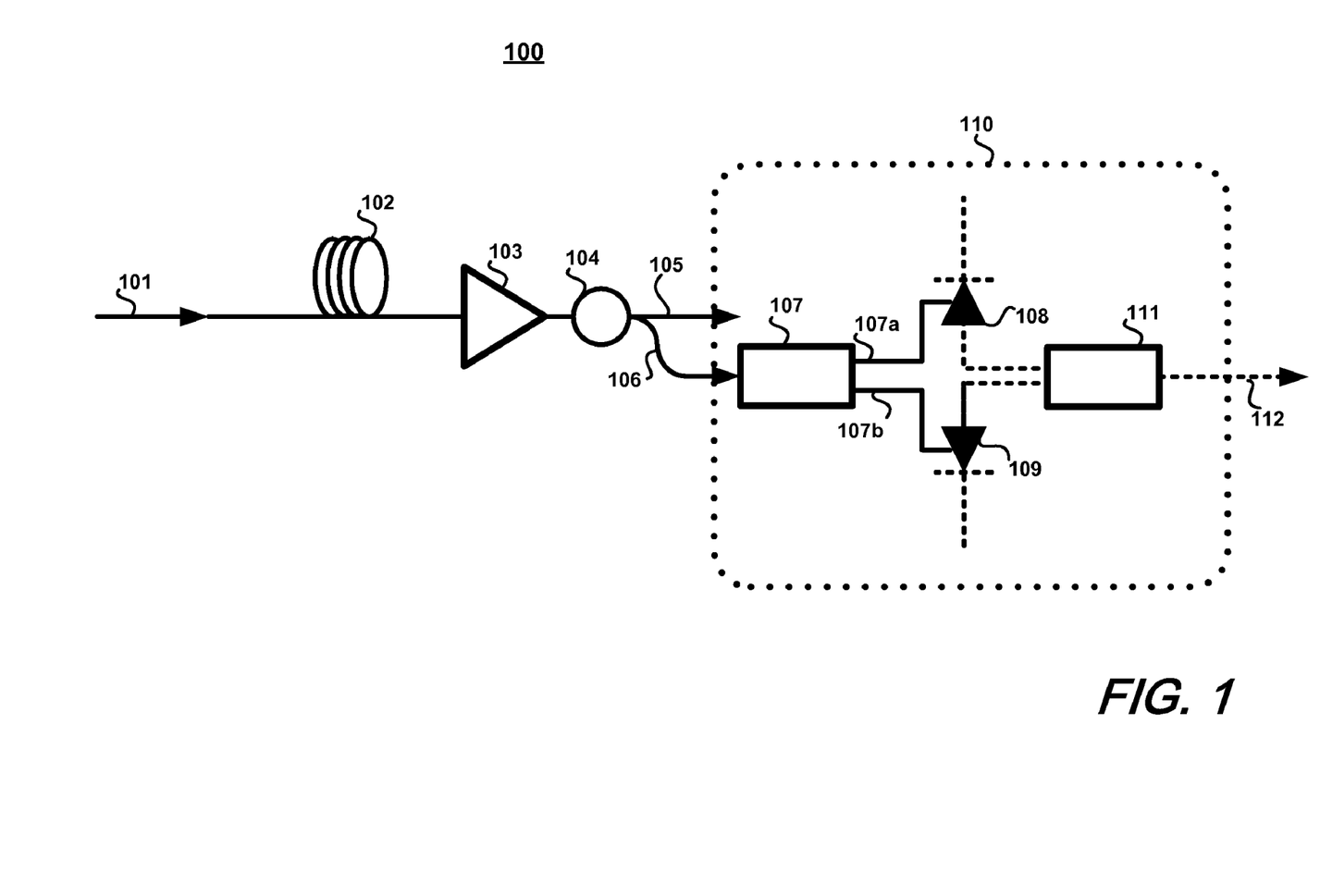
FIG. 1 shows a schematic arrangement of an optical apparatus according to the principles of the invention.

With reference to FIG. 1, there it shows a schematic of a repeater including an apparatus for detecting LOS according to the principles of this invention. More specifically, FIG. 1 schematically shows a transmission system repeater site 100, which receives an input WDM optical signal 101 comprising a plurality of wavelength channels, each channel separated (in frequency) by predetermined channel spacing. The input WDM optical signal 101 in this example includes a Dense Wavelength Multiplexed (DWDM) signal. The WDM optical signal 101 is transmitted over a fiber span 102 and is subsequently amplified by an optical amplifier 103, which for example compensates for power loss in the transmission fiber.

The optical amplifier 103 may be a distributed Raman Amplifier (DRA), an Erbium Doped Fiber Amplifier (EDFA), or a hybrid optical amplifier, that are well known and widely used in optical transmission systems. A DRA uses the transmission fiber span itself as a gain medium when the fiber span is pumped by a light source which can either counter-propagate or co-propagate with the signal. The light source usually consists of a few lasers whose wavelengths are about 100 nm shorter than those of the WDM signal channels.

Those skilled in the art will appreciate that while amplifying the input WDM optical signal the optical amplifier also amplifies the spontaneous emission noise, thereby generating cumulatively, an amplified spontaneous emission (ASE) noise at each repeater site. Based on the design parameters of the optical amplifiers, a maximum ASE noise power that contributes to the total measured average power at each repeater site can be estimated.

Still referring to FIG. 1, an optical coupler/splitter 104 splits the amplified input WDM optical signal in to two parts 105 and 106. One part of the amplified input WDM optical signal, 105 is directed to a subsequent repeater (not shown), and only a substantially smaller part 106 (hereinafter input WDM optical signal) of the amplified WDM optical signal 101 is tapped for detecting LOS. A LOS detection unit 110 comprises a periodic optical filter 107 for splitting the WDM optical signal 106 into two output signals, each output signal directed to a respective output port 107*a* and 107*b*. Two substantially identical photodiodes 108, and 109, receive respective ones of the output signals from the output ports 107*a*, and 107*b*, and generate photocurrents in proportion to optical powers of the received optical signals.

There are apparatuses and methods well known to those skilled in the art that are widely used to convert photocurrent response of a photodiode into a measure of optical power. For example, a photodiode may be integrated with an electronic circuit of an optical power meter, such that the photocurrent generated by the photodiode is converted to a 'measured optical power'. In one preferred embodiment, a LOS computing unit 111 receives measured optical power from the photodiodes for LOS detection. In an alternative embodiment, photocurrents generated by the photodiodes may be used in an electronic circuit of the LOS computing unit 111 for LOS detection. Those skilled in the art will appreciate that these and other alternative design choices are well within the scope of the invention.

Figure 2:
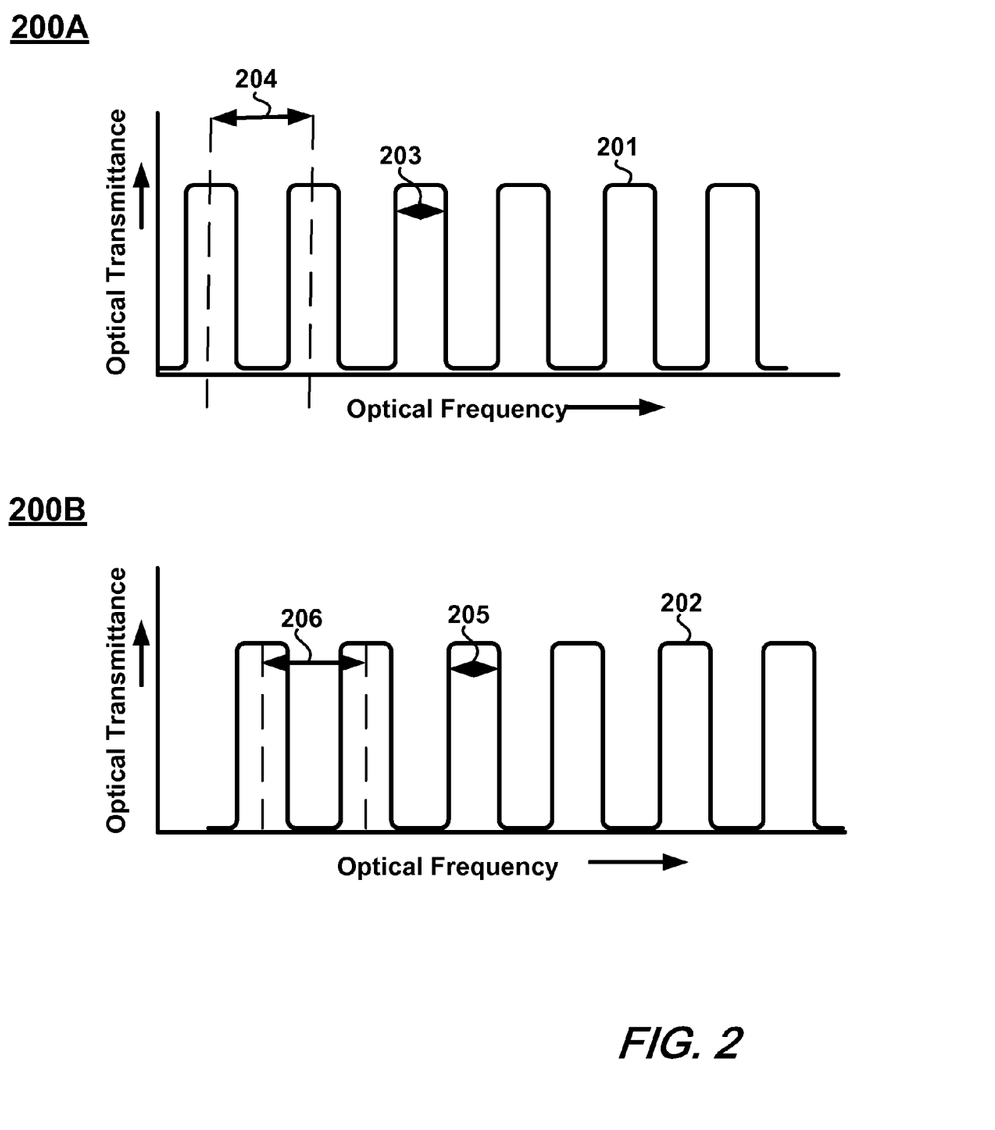
FIG. 2 shows exemplary periodic transmission characteristics (in frequency domain) at two output ports, respectively, of a periodic filter of the periodic filter.

With simultaneous reference to FIG. 1 and FIG. 2, exemplary passband transmission characteristics 200*a* and 200*b* at the output ports 107*a*, and 107*b* of the periodic optical filter, are respectively shown in FIG. 2. More specifically, the transmission characteristic 200*a* shows an exemplary optical transmittance passband profile at the output port 107*a*, wherein a passband 201 having a bandwidth 203 is periodically repeated in the frequency domain, with a periodicity (or FSR) 204. The passband periodicity is equal to the difference in center frequencies of adjacent passbands. A uniform optical transmittance over the entire bandwidth (flat-top passband profile) is preferable, but not necessary.

In a preferred embodiment of the invention, the periodic filter is designed such that the passband center frequencies of the output port 107*a* coincide with the channel centers of the amplified input WDM optical. As a result, the plurality of signal wavelength channels of the input WDM signal are primarily directed to the output port 107*a*, (on-grid port). When the signal spectral bandwidth is large (e.g., for a 40-Gb/s signal), a substantially smaller fraction of the signal power from the on-grid port may leak to the off-grid port.

Continuing to refer to FIG. 2, the transmission characteristics 200*b* shows an exemplary optical transmittance passband profile at the output port 107*b* (off-grid port), wherein a passband 202 having a bandwidth 205, is periodically repeated in the frequency domain with a periodicity 206. It should be noted that the on-grid port and the off-grid port in this example are interchangeable and is a matter of design choice.

In one preferred embodiment, the passband profile 200*b* is complementary of the passband profile 200*a*, wherein high optical transmittance regions of the passband profile 200*b*, coincides with low optical transmittance regions of the passband profile 200*a*. In the example shown in FIG. 2, the passband profiles 200*a* and 200*b* are shown to be symmetric, wherein the 3-dB bandwidths 203 and 205 are substantially equal, and are substantially equal to half the periodicity 204 (and 206).

Those skilled in the art will appreciate that the selection of periodicity and bandwidths for the passband profiles 200*a* and 200*b* are matters of design choices. For example, according to one design choice, the passband profiles 200*a* and 200*b* may be asymmetric, wherein the bandwidth 203 is not equal to half the periodicity 204. According to yet another design choice, the passband profiles 200*a* and 200*b* may have the same periodicity but different bandwidths.

Figure 3:
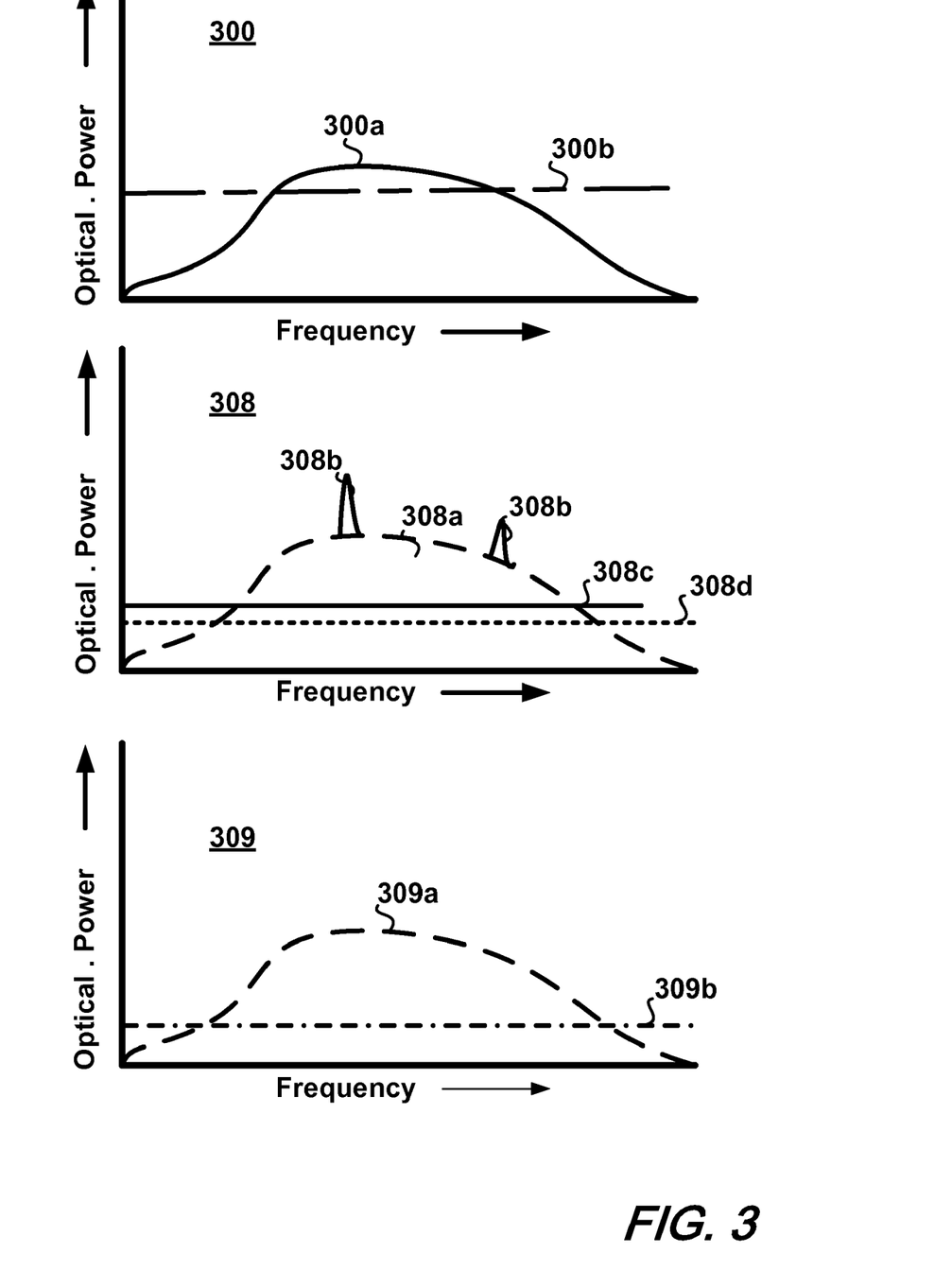
FIG. 3 shows an exemplary ASE power spectrum, noise power spectrum and signal power spectrum, together with respective average powers.

Referring now to FIG. 3, there it shows schematic representation of three different optical spectral profiles 300, 308, and 309, and optical power levels for each profile, respectively. It should be noted that these figures are meant to be illustrative and do not represent absolute measured optical powers.

Referring simultaneously to FIG. 1, and FIG. 3, the spectral profile 300a in FIG. 3 represents an ASE noise spectrum of an optical amplifier. The optical power level shown by 300b represents total ASE noise power. The spectral profile 308a includes signal spectral profiles 308b superimposed on the ASE noise spectral profile at the on-grid port. The number of signal channels in this illustrative example is limited to two for the sake of clarity. The optical power level 308c represents total optical power, including optical signal power and the ASE noise power 308d at the on-grid port. The spectral profile 309a represents an ASE noise spectrum, together with the total ASE noise power 309b, at the off-grid port. For the sake of clarity, the signal spectral profiles at the off-grid port are absent since the vast majority of signal spectral components is directed to the on-grid port.

Those skilled in the art will appreciate that the total ASE noise power ($P_N$) is distributed between the on-grid, and off-grid ports in proportion to their respective passband bandwidths. In the exemplary case of symmetric passband profiles 200a and 200b shown in FIG. 2, since the passband bandwidths 203 and 205 are substantially the same, the total ASE noise power $P_N$ is distributed equally between the two output ports.

Therefore, in the absence of any contribution from signal channel(s) at the on-grid port, the measured optical powers $P_1$ and $P_2$ at the on-grid, and off-grid ports respectively, are substantially equal to $P_N/2$. In the presence of signal channel(s) at the on-grid port, measured optical power $P_1$ will also include majority of the signal power of the channel(s). Therefore $P_1$ will be substantially greater than $P_2$.

It should be noted that if the passband profiles 200a and 200b are asymmetric, measured optical powers $P_1$ and $P_2$ are different, even in the absence of any contribution from the signal channel(s) at the on-grid port. Accordingly, the measured optical power needs to be normalized in proportion to their respective passband bandwidths.

Referring back again to FIG. 1, the LOS detecting unit 110 detects LOS according to different criteria assigned by the network management. In one exemplary embodiment, the LOS computing unit 111 receives measured optical powers $P_1$ and $P_2$ from the photodiodes 108 and 109, which includes ASE noise power and/or signal power, as the case may be. The LOS computing unit 111 computes the ratio of the optical powers received from the photodiodes 108 and 109, and compares the computed power ratio to a predetermined threshold number, and detects LOS according to a pre-assigned criterion.

One preferred criterion used to detect LOS is by implementing a noise power cancellation effect. Accordingly, the LOS computing unit computes repeatedly (e.g., every 10 millisecond), the ratio of measured optical powers $P_1$ and $P_2$, such that $R=(P_1/r)/P_2$ where r is a normalization ratio that depends on the 3-dB passband bandwidth of the on-grid port $B_1$, and that of the off-grid, $B_2$. By way of example, $r=B_1/B_2$. Those skilled in the art will appreciate that a LOS decision can be made based on
If $R \leq V$,
 LOS='YES';
else,
 LOS='NO'.
where V is a threshold value that is always larger than 1.

One criterion to determine a threshold value V is based on the overall common-mode rejection ratio (CMRR) of the LOS detection apparatus. The CMRR can be defined as $CMRR=(P_{1,LOS}/r+P_{2,LOS})/|P_{1,LOS}/r-P_{2,LOS}|$ where $P_{1,LOS}$ and $P_{2,LOS}$ are, respectively, the measured powers from the on-grid and off-grid ports in the absence of signal or when a LOS occurs.

The CMRR depends on the design of the periodic filter and more particularly, but not limited to the passband transmission characteristics of the on-grid and off-grid ports of the periodic filter. Other parameters that affect the CMRR are, the linearity, and accuracy of the photodiodes and the common mode rejection of the electronic circuit under different temperatures and degrees of aging.

When a LOS occurs, the measured power ratio satisfies $R_{LOS}=(P_{1,LOS}/r)/P_{2,LOS}<1+2/CMRR$ Since: $(P_{1,LOS}/r)/P_{2,LOS}=1+(P_{1,LOS}/r-P_{2,LOS})/P_{2,LOS}=1+2(P_{1,LOS}/r-P_{2,LOS})/(P_{1,LOS}/r+P_{2,LOS})<1+2|P_{1,LOS}/r-P_{2,LOS}|/(P_{1,LOS}/r+P_{2,LOS})=1+2/CMRR$ Those skilled in the art will appreciate that the threshold value V used in the LOS decision can be related to the overall CMRR as $V=1+n/CMRR,$ where n is a constant substantially larger than 2. Preferably, n is selected to be as close to 2 as possible. To allocate a 50% margin to accommodate other measurement errors, n can be selected to be 3 (instead of 2), so for a typical CCMR of 60 (or about 18 dB), we have $V=1+3/60=1.05$.

LOS detection based on the ratio of the measured optical powers is effective in cancelling the contribution of ASE noise power from the measured optical power, especially when the signal power is low as compared to the ASE noise power. However, the LOS detection by computing R has limitations. For example, if $P_1$ and/or $P_2$ are too high, the photodiodes saturate, and the ratio R cannot be computed very accurately. In another situation, if $P_1$ and/or $r*P_2$ are too small, the finite detection resolution and the common-mode rejection of the detection circuit of the LOS computing unit 111 limits the accuracy of the computed ratio R.

Therefore, additional criteria for LOS detection may be set simultaneously, wherein the LOS computing unit 111 compares the measured optical power $P_1$ at the on-grid port, to two threshold powers $P_{min}$ and $P_{max}$. Accordingly, the LOS decision becomes
If $P_1 \leq P_{min}$,
 LOS='YES';
elseif $P_1 > P_{max}$,
 LOS='NO';
elseif $R \leq V$,
 LOS='YES';
else,
 LOS='NO'.

The threshold power $P_{max}$ is the maximum possible ASE noise power measured at the on-grid port, which is determined from, but is not limited to design parameters of the optical amplifier(s), and the characteristics of the fiber span monitored by the LOS detection unit. For example, if the optical amplifier 103 is a Raman amplifier, $P_{max}$ is determined from the maximum allowable noise power associated with the total Raman gain for the fiber span at the on-grid port. The decision criterion associated with $P_{max}$ is particularly found useful if the measured optical powers $P_1$ and/or $P_2$ are too high, such that either one or both the photodiodes are saturated and the accuracy of the ratio R is limited.

The threshold power $P_{min}$ is the minimum possible signal noise power measured at the on-grid port, which is determined from, but is not limited to the power of a single WDM signal channel before it is launched into the fiber span under the LOS monitoring and loss of the fiber span. The decision criterion associated with $P_{min}$ is particularly useful if the measured optical powers $P_1$ and/or $r*P_2$ are too small, such that the finite detection resolution, and the common-mode rejection of the detection circuit of the LOS computing unit 111 limits the accuracy of the ratio R.

In one representative embodiment, the periodic filter 107 shown in FIG. 1 comprises a Michelson Delay Interferometer, and in particular, an athermal Michelson Delay Interferometer (A-MDI) using an athermal design such that the temperature induced passband frequency drift may be maintained to be less than 10% of the passband periodicity or FSR (for example, less than 5 GHz over a 50 GHz FSR) over −5° C. to 70° C. temperature range. In addition, the A-MDI may be designed such that the passband center frequencies of the periodic filter are made to coincide with an International Telecommunication Union (ITU) specified WDM optical signal grid.

Figure 4:
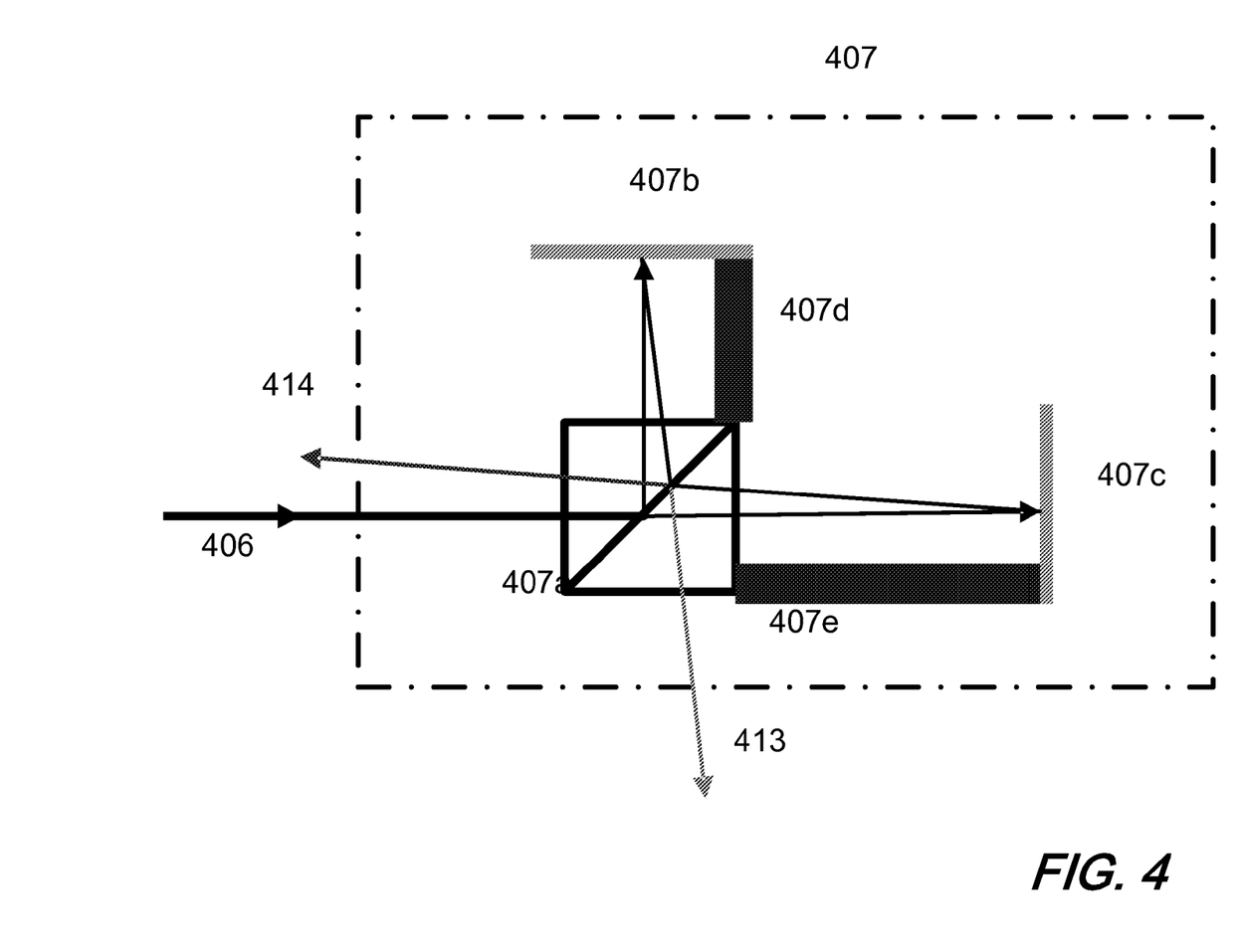
FIG. 4 shows a schematic arrangement of the optical apparatus including free-space optics based Athermal Michelson Delay Interferometer (A-MDI) according to the principles of the invention.

Referring now to FIG. 4, there it shows a schematic of an A-MDI 407 included in the LOS detection unit, As shown therein, the A-MDI 407 includes an optical beam splitter 407a for splitting the input WDM optical signal 406 along two optical paths. Accordingly, one portion of the input WDM signal is directed to a first high-reflection mirror 407b and a second portion is directed to a second high-reflection mirror 407c. After refection from the respective mirrors, the two portions are re-directed back to the optical beam splitter 407a, where the two portions of the WDM signal interfere with each other.

An output signal generated by the constructive interference between the two portions exits the interferometer through a port 413, while a second output signal generated by the destructive interference between the two portions exits the interferometer through a second port 414. Two mechanical spacers 407d, and 407e fix the distances between the two mirrors 407b and 407c and the optical beam splitter 407a. The spacers are of unequal length, and the difference in the lengths of the two spacers is substantially half of the optical length difference between the two interference paths, resulting in an optical delay $T_{delay}$ between the two optical paths.

The optical delay, $T_{delay}$, between the two paths is equal to the optical length difference divided by the speed of light, c, and is the inverse of the FSR of the A-MDI. For example, for a FSR of 50 GHz, the delay is 20 ps, corresponding to an optical length difference of about 6 mm, or a spacer length difference of about 3 mm. The Michelson delay interferometer can be readily made to be athermal by ensuring the spacer length difference to be temperature independent or insensitive. Typically, temperature induced passband frequency drift may be maintained to be less than 10% of the FSR (for example, less than 5 GHz over a 50-GHz FSR) over −5° C. to 70° C. temperature range It should be noted that the exact amount of delay to be introduced is a design choice, taking into account not only the channel spacing of the input WDM signal but also the exact channel locations of the WDM signal, so that the passband center frequencies of at least one output of the interferometer are made to coincide with the center frequencies of signal channels of the input WDM signal. Usually, fine phase adjustment between the two interference paths is needed to realize this. In an exemplary case, the fine phase adjustment is achieved by inserting a thin waveplate whose thickness can be adjusted, e.g., through a mechanical means, in one of the two interference paths.

In another representative embodiment, the periodic filter 107 shown in FIG. 1 comprises a step-phase Michelson delay interferometer, and in particular, an athermal Michelson Delay Interferometer (A-SP-MDI) using an athermal design such that the temperature induced passband frequency drift may be maintained to be less than 10% of the passband periodicity or FSR (for example, less than 5 GHz over a 50 GHz FSR) over −5° C. to 70° C. temperature range. In addition, the A-SP-MDI may be designed such that the passband center frequencies of the periodic filter are made to coincide with an International Telecommunication Union (ITU) specified WDM optical signal grid.

Figure 5:
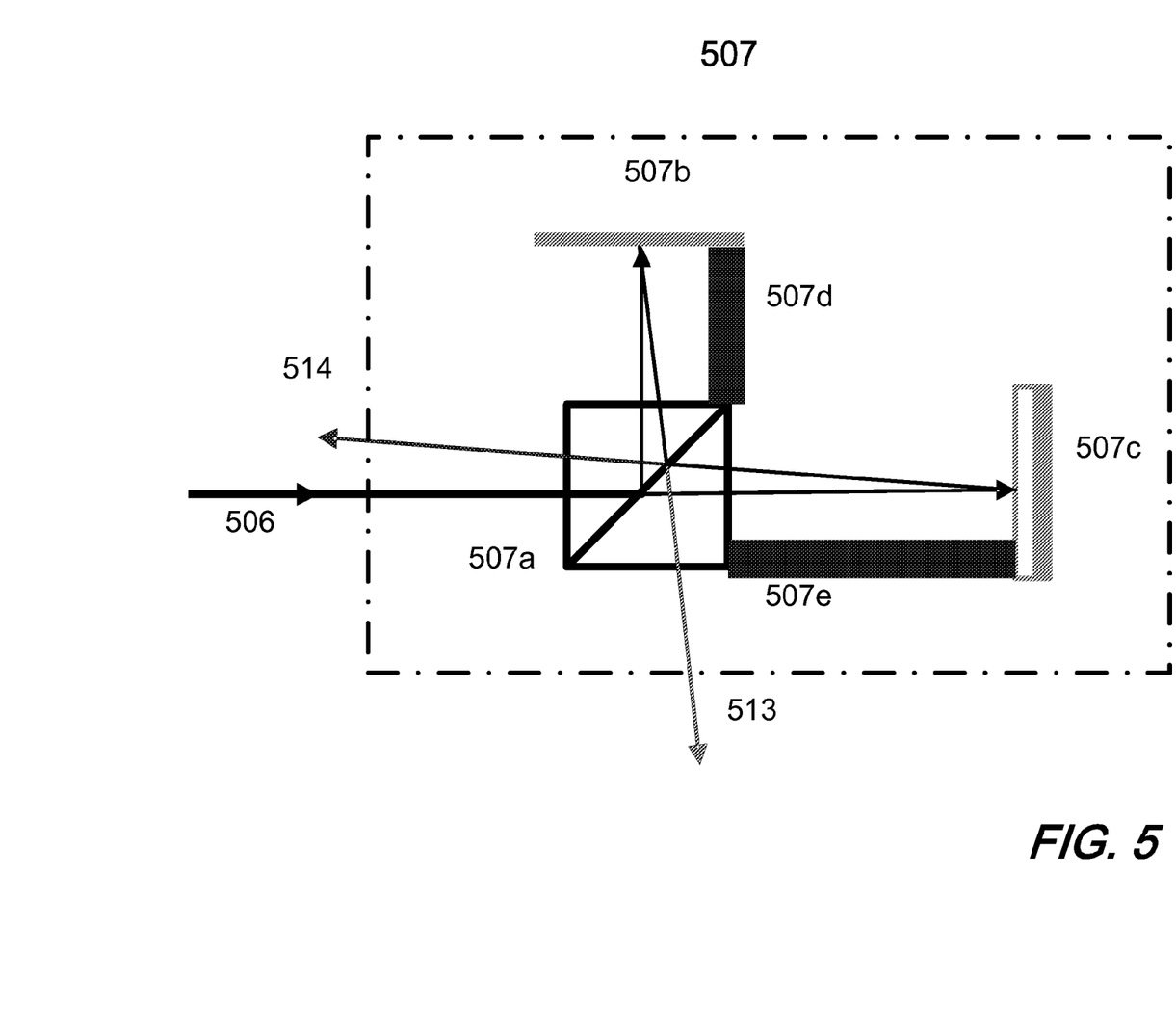
FIG. 5 shows a schematic arrangement of the optical apparatus including free space optics based step-phase Michelson delay interferometer according to the principles of the invention.

Referring now to FIG. 5, there it shows a schematic of an A-SP-MDI 507 included in the LOS detection unit according to the principles of the invention, As shown therein, the A-SP-MDI 507 includes an optical beam splitter 507a for splitting the input WDM optical signal 506 into two portions, each one directed along an optical path towards a respective high-reflection optical elements 507b and 507c, at least one of the optical elements being is a reflective Gires-Tournois interferometer.

After refection from the respective reflection elements, the two optical beams are re-directed back to the optical beam splitter 507a, where the two portions of the WDM signal interfere with each other. An output generated by constructive interference between the two portions of the WDM signal exits the interferometer through a port 513, while a second output generated by destructive interference between the two portions of the WDM signal exits the interferometer through a second port 514. Two mechanical spacers 507d and 507e have substantially similar design and functionality as described earlier in reference with the A-MDI FIG. 4, are provided in this embodiment as well.

In a preferred embodiment, response times of the photodiodes 108 and 109 shown in FIG. 1 are selected to be substantially longer than a bit period of the input WDM optical signal, such that the photodiodes measure average optical power over multiple bit periods. In the embodiment shown in FIG. 1, for example, if the input WDM optical signal is operating at 10 Gb/s data rate, the photodiodes have at least 1 milliseconds response time, whereas a bit period for example at this data rate is 100 picoseconds.

The preferred embodiments shown and described in the previous section are meant only to be illustrative for highlighting the inventive aspects clearly. Those skilled in the art will appreciate that different structural and functional variations are within the scope of the invention as set by the following of claims.

We claim:

1. An apparatus for detecting loss of optical signal (LOS) at a repeater site of a Wavelength Division Multiplexed (WDM) optical transmission system, said apparatus comprising:

a periodic filter for splitting an input WDM optical signal having a plurality of wavelength channels into two output signals, said filter having an input port for receiving the input WDM optical signal, and two output ports each directing a respective one of the output signals, said output ports exhibiting complementary periodic passbands transmission characteristics in the frequency domain;

a first and a second photodiode, each one for receiving a respective one of the output signals, and for generating a respective photocurrent, said photocurrents to be used for measuring optical powers $P_1$ and $P_2$, respectively, of the received output signals; and a LOS computing unit for
receiving measured optical powers from said photodiodes,
computing the ratio $R=(P_1/r)/P_2$, where r is a normalization factor, and
comparing said ratio R with a predetermined threshold value V, such that
If $R \leq V$,
LOS='YES';
else,
LOS='NO';
wherein the predetermined threshold value V is related to common-mode rejection ratio (CMRR) of the detection apparatus as V=1+n/CMRR where n is a constant between 2 and 10.

2. The apparatus of claim 1, wherein the normalization factor r is approximately equal to the ratio between the 3-dB passband bandwidths of the two output ports.

3. The apparatus of claim 1, wherein the LOS computing unit further compares the measured optical power $P_1$ to a threshold power $P_{min}$, such that
If $P_1 \leq P_{min}$,
LOS='YES'.

4. The apparatus of claim 1, wherein the LOS computing unit further compares the measured optical power $P_1$ to a high-threshold power $P_{max}$, such that
If $P_1 > P_{max}$,
LOS='No'.

5. The apparatus of claim 1, wherein the periodic filter is an athermal filter.

6. The apparatus of claim 5, wherein the athermal periodic filter has a temperature induced passband frequency drift of less than 10% of the passband periodicity, over −5° C. to 70° C. temperature range.

7. The apparatus of claim 1, wherein the periodic filter uses free-space optics, said periodic filter selected from a group consisting of a Michelson Delay Interferometer, and a step-phase Michelson Delay Interferometer.

8. The apparatus of claim 1, wherein the free spectral range (FSR) of the periodic filter is equal to about the channel spacing of the input WDM optical signal.

9. The apparatus of claim 1, wherein the periodic filter is constructed such that the passband center frequencies of the optical transmittance of at least one output port of the filter coincides with an International Telecommunication Union (ITU) prescribed WDM grid.

10. The apparatus of claim 1, wherein the periodic filter is symmetric, such that the 3-dB bandwidth of the periodic passbands is substantially equal to half the periodicity.

11. The apparatus of claim 1, wherein the periodic filter is asymmetric, such that the 3-dB bandwidth of the periodic passbands is not equal to half the periodicity.

12. The optical apparatus of claim 1, wherein the response times of the first and second photodiodes are substantially longer than a bit period of the input WDM optical signal, such that the photodiodes measure optical power over several bit periods of the input WDM optical signal.

13. A method for detecting loss of optical signal (LOS) at a repeater site of a Wavelength Division Multiplexed (WDM) optical transmission system, said method comprising the steps of:
splitting an input WDM optical signal having a plurality of wavelength channels into two output signals, such that at least one signal includes the plurality of wavelength channels;

measuring optical powers $P_1$ and $P_2$ of the two output signals;
computing a ratio $R=(P_1/r)/P_2$, where r is a normalization factor, and
comparing said ratio R with a predetermined threshold value V, such that
If $R \leq V$,
LOS='YES';
else,
LOS='NO';
wherein the predetermined threshold value V is related to common-mode rejection ratio (CMRR) of the detection apparatus as V=1+n/CMRR where n is a constant between 2 and 10.

14. The method of claim 13, wherein normalization factor r is approximately equal to the ratio between the 3-dB passband bandwidths of the two output ports.

15. The method of claim 13, wherein the said separating of the input WDM signal is performed in an athermal periodic filter, said filter having an input port, and two output ports, wherein transmission characteristics of said output ports exhibit complementary optical transmittance, and wherein the periodic passbands of at least one output port is aligned with the channels of the input WDM signal.

16. The method of claim 13, wherein the said separating of the input WDM signal is performed in an athermal periodic filter using free-space optics, said athermal periodic filter selected from a group consisting of a Michelson delay interferometer, and a step-phase Michelson delay interferometer.

17. The method of claim 13, wherein said separating is performed in an athermal periodic filter which is made such that the passband center frequencies of the optical transmittance of at least one output port of the filter coincide with channel centers of the input WDM signal.

18. The method of claim 13, wherein the step of detecting the LOS further includes the step of comparing the measured optical power $P_1$ to a low-threshold power $P_{min}$, such that
If $P_1 \leq P_{min}$,
LOS='YES'.

19. The method of claim 13, wherein the step of detecting the LOS further includes the step of comparing the measured optical power $P_1$ to a high-threshold power $P_{max}$, such that
If $P_1 > P_{max}$,
LOS='No'.

20. An apparatus for detecting loss of optical signal (LOS) at a repeater site of a Wavelength Division Multiplexed (WDM) optical transmission system, said apparatus comprising:
a means for splitting an input WDM optical signal having a plurality of wavelength channels, into two output signals, said means having an input port for receiving the input WDM signal, and two output ports, said output ports exhibiting complementary periodic passband transmission characteristics in the frequency domain, said output ports for directing a respective one of the output signals, wherein at least one output signal includes the plurality of wavelength channels of the input WDM optical signal;
a first and a second means for receiving a respective one of the output signals, and for generating a photocurrent to be used for measuring optical powers $P_1$ and $P_2$, respectively, of the received output signals; and
a means for computing LOS, said computing means
for receiving measured optical powers from photodiodes,
computing the ratio $R=(P_1/r)/P_2$, where r is a normalization factor, and comparing said ratio R with a predetermined threshold value V, such that
If R≦V,
 LOS='YES';
else,
 LOS='NO';
wherein the predetermined threshold value V is related to common-mode rejection ratio (CMRR) of the detection apparatus as V=1+n/CMRR where n is a constant between 2 and 10.

21. The apparatus of claim 20, wherein the normalization factor r is approximately equal to the ratio between the 3-dB passband bandwidths of the two output ports.

* * * * *